Sept. 1, 1953          V. G. KLEIN          2,650,677
LUBRICATING APPARATUS
Filed Aug. 28, 1950          2 Sheets-Sheet 1
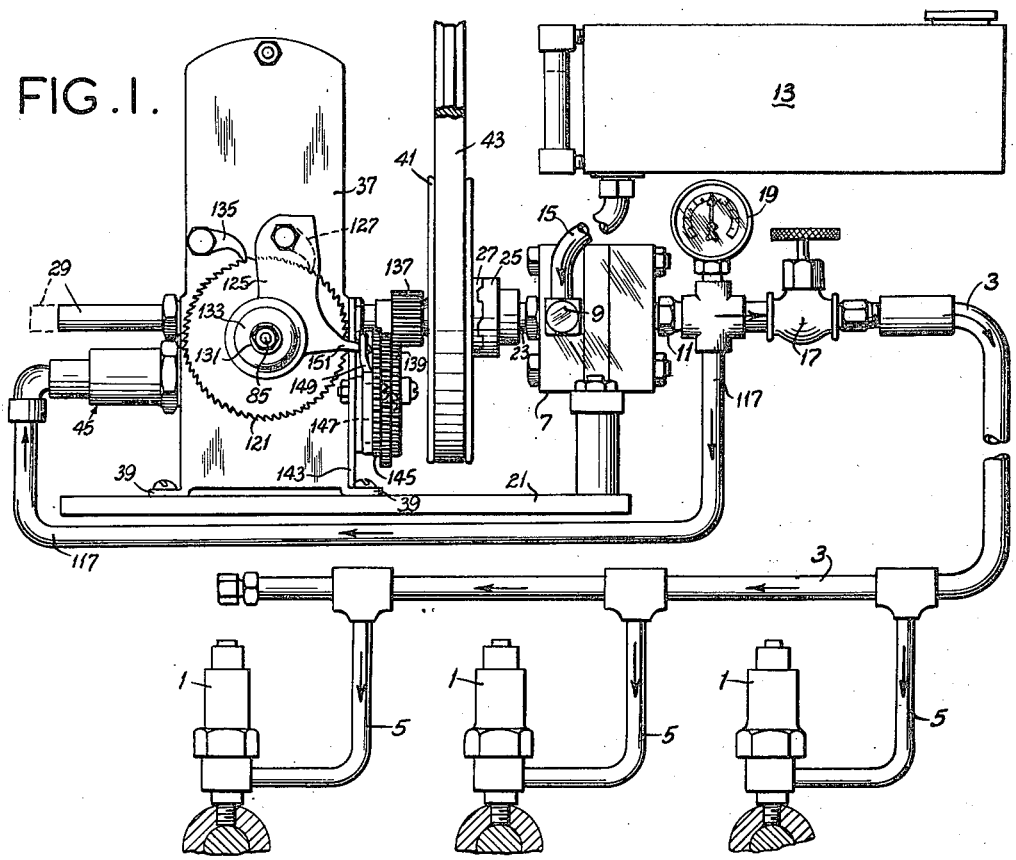
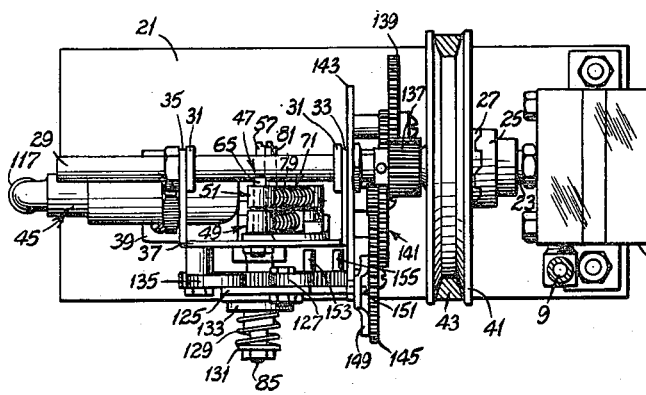
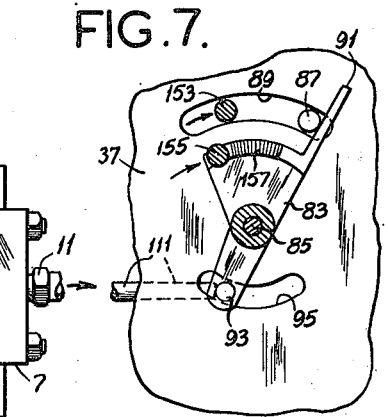
Victor G. Klein,
Inventor.
Haynes and Koenig,
Attorneys.

Sept. 1, 1953         V. G. KLEIN         2,650,677
LUBRICATING APPARATUS
Filed Aug. 28, 1950         2 Sheets-Sheet 2
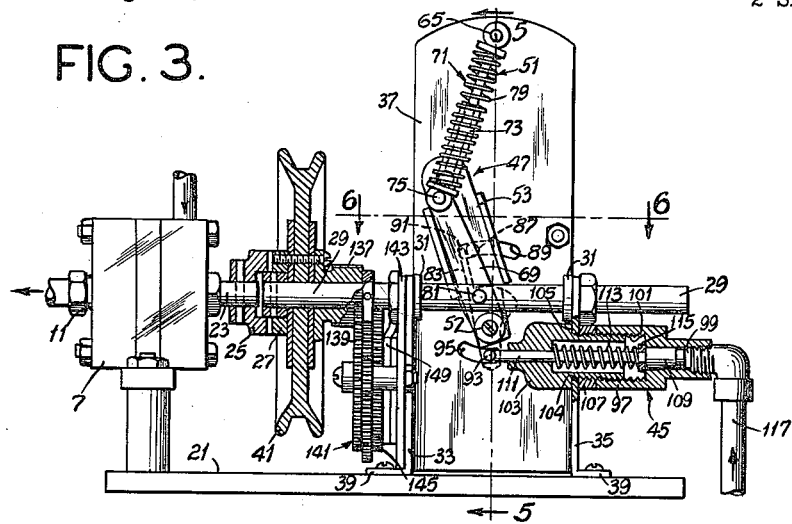
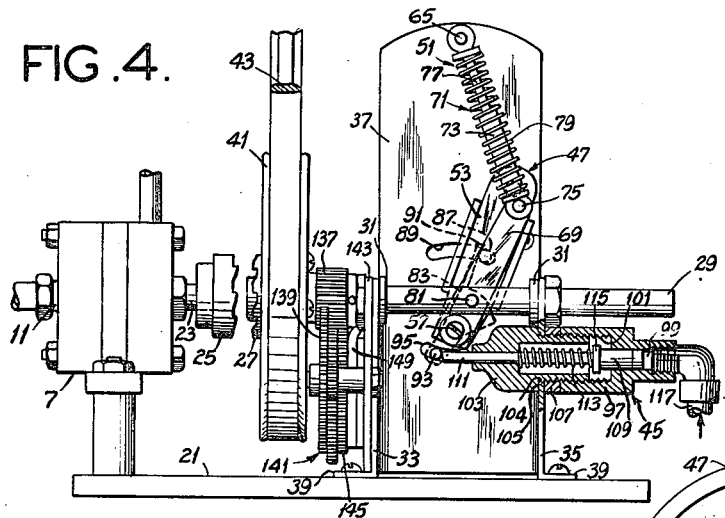
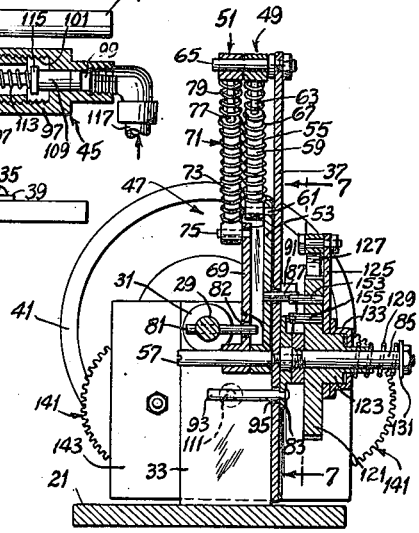
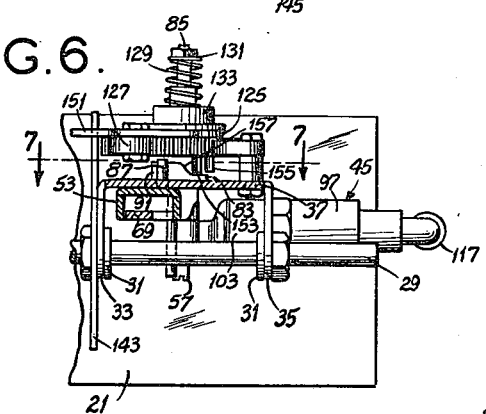
Victor G. Klein,
Inventor.
Haynes and Koenig,
Attorneys.

Patented Sept. 1, 1953

2,650,677

UNITED STATES PATENT OFFICE 2,650,677

LUBRICATING APPARATUS

Victor G. Klein, Overland, Mo., assignor to Lincoln Engineering Company, St. Louis, Mo., a corporation of Missouri Application August 28, 1950, Serial No. 181,819

16 Claims. (Cl. 184—27)

1

This invention relates to lubricating apparatus, and more particularly to a so-called power take-off unit for automatically periodically actuating and charging lubricant injectors in a lubricating system of the type wherein various points of a power-driven device requiring lubrication are to be periodically lubricated by the injectors.

The principal object of the invention is the provision of a power-operated lubricating apparatus for periodically actuating and charging lubricant injectors provided for lubricating a power-driven device, the lubricating apparatus being particularly adapted to derive its power wholly from the device to be lubricated through a power take-off. This makes it possible readily to provide for automatic periodic lubrication of any power-driven device, without requiring a separate or independent source of power for the lubricating apparatus, the latter deriving its power solely from the power-driven device. For example, the power required for operating the lubricating apparatus of this invention may be derived from any continuously rotating part of the power-driven device to be lubricated. With the power take-off unit of this invention, any power-driven device may be economically provided with an automatic periodically functioning lubricating system, the unit itself being of relatively simple and economical construction, reliable in operation, and capable of being readily and economically installed to service the injectors on the power-driven device.

In general, the lubricating apparatus of this invention comprises a lubricant pump having an inlet adapted for connection to a supply of lubricant, and an outlet for connection of a lubricant line for supplying lubricant under pressure to one or more lubricant injectors of a known type which function to inject a charge of lubricant upon development of injector-cycling pressure in the lubricant line. A drive for the pump including a clutch is adapted to be powered by the power-driven device to be lubricated through a power take-off. Means including a timer which is powered by energy derived from the lubricating apparatus itself controls the clutch in the drive for the pump in such manner as periodically to engage the clutch and thereby to initiate operation of the pump. Means responsive to pressure developed by the pump controls the clutch in the drive for the pump and acts in response to development of injector-cycling pressure to disengage the clutch and terminate operation of the pump, following each initiation of its operation. With this arrangement, assum-

2 ing that the operation of the pump has just been initiated by the timer, the pump operates to develop injector-cycling pressure in the lubricant line, thereby causing the injectors to inject their charges of lubricant, and then actuates the pressure-responsive means for discontinuing the drive for the pump. Thereupon, the pressure-responsive means terminates the operation of the pump, and the pump remains out of operation until the timer initiates the operation of the pump for the next cycle. Thus, initiation of the operation of the pump is controlled solely by a timer deriving the necessary power for its operation from the lubricated apparatus itself, and termination of the operation of the pump is controlled solely by means responsive to pressure developed by the pump during its period of operation. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a view in elevation of one side of one specific embodiment of the lubricating apparatus of the invention, illustrating the apparatus as connected to a number of lubricant injectors in a system for lubricating a power-driven device (not shown);

Fig. 2 is a plan view of the lubricating apparatus of Fig. 1;

Fig. 3 is a view in elevation of the other side of the apparatus, parts being broken away and shown in section;

Fig. 4 is a view similar to Fig. 3 but illustrating certain parts in a different position from that shown in Fig. 3, certain parts shown broken away in Fig. 3 being unbroken in Fig. 4;

Fig. 5 is a vertical transverse section taken on line 5—5 of Fig. 3;

Fig. 6 is a fragmentary horizontal section taken on line 6—6 of Fig. 3; and

Fig. 7 is an enlarged fragmentary vertical section taken on line 7—7 of Figs. 5 and 6.

Similar reference characters indicate corresponding parts throughout the several views of the drawings.

Referring to the drawings, and particularly to Fig. 1, one specific embodiment of the lubricating apparatus of this invention is shown as actuating and charging a number of lubricant injectors 1 through a lubricant line 3, branch lines connecting line 3 to the individual injectors. Each of the latter is of a type which receives lubricant from the lubricant line, and which operates in response to development of a predetermined injector-cycling pressure in the lubricant line to inject a measured charge of lubricant, and which depends for resetting and reloading with another measured charge of lubricant upon relief of pressure in the lubricant line subsequent to injection. Injectors of this type are well known in the art and require no further description, their detailed construction not being material to this disclosure. Disclosures of injectors of this type which might be used will be found in U. S. Patents 2,122,177, 2,141,022, 2,155,250, 2,283,638 and 2,448,583. The outlets of the injectors are connected to parts of a power-driven device requiring lubrication. A typical part to which the outlet of an injector is connected, for example, is a bearing. The power-driven device lubricated by the injector is not shown, its details not being material to this disclosure, except insofar as it provides a source of power for the lubricating apparatus of this invention. It might, for example, be a conventional machine tool.

The lubricating apparatus of this invention comprises a lubricant pump 7, more particularly a conventional rotary pump, and preferably a conventional gear pump suitable for pumping lubricant. A gear pump is particularly suitable for the purpose, inasmuch as it inherently provides for relief of pressure in the lubricant line 3 when operation of the pump terminates, without any special provision for such relief. It is contemplated that other rotary pumps, which are also inherently self-relieving, may be used. By self-relieving, I mean that pressure built up in the pump outlet and the lubricant line 3 during operation of the pump will be vented back through the pump to its inlet upon termination of operation of the pump. The pump inlet is designated 9 and the pump outlet 11. A lubricant reservoir 13 is connected by a conduit 15 to the pump inlet. Lubricant line 3 is connected to the pump outlet. A cut-off valve 17 and a pressure gauge 19 may be connected in lubricant line 3, but are not essential.

The pump 7 is mounted on a base 21. A pump shaft 23 extends horizontally from one side of the pump. On the end of this shaft is fixed a jaw 25 of a claw clutch. This jaw is the driven element of the clutch. The other jaw 27 of the claw clutch, this being the driving element of the clutch, is rotary on the end of a non-rotary clutch shifter rod 29 coaxial with the pump shaft 23. Rod 29 is axially slidable in bearings 31 in vertical flanges 33 and 35 which extend transversely with respect to the rod from a vertical mechanism plate 37. Plate 37 occupies a vertical plane parallel to and offset from the rod 29. The flanges 33 and 35 have outturned feet 39 at their lower edges by means of which the plate 37 is secured to the base. The plate 37 extends higher than the flanges. The clutch jaw 27 is fixed to a drive pulley 41 which is rotary on the rod 29. The pulley 41 is an element of a power take-off from the power-driven device lubricated by the injectors 1, this take-off including a drive belt 43 encircling the pulley 41 and a pulley (not shown) fixed to a continuously rotating part of the power-driven device.

The clutch jaw 27 is continuously driven by means of belt 43 and pulley 41 from the power-driven device lubricated by the injectors 1. Rod 29 is axially slidable in bearings 31 between a clutch-engaging pump-driving position wherein clutch jaw 25 and 27 are engaged (Figs. 1–3), and a clutch-disengaging position (Fig. 4) wherein the clutch jaws are disengaged. With the rod 29 in pump-driving position, the clutch jaws are engaged to drive the pump, which thereupon delivers lubricant under pressure from the reservoir 13 through lubricant line 3 and branch lines 5 to the injectors 1. When pressure in line 3 has been built up to injector-cycling value, the injectors operate to inject their measured charges of lubricant to the points of the power-driven device which they supply with lubricant. The apparatus includes means responsive to pressure developed by the pump controlling the drive for the pump and acting in response to development of a pressure somewhat higher than injector-cycling pressure to shift the rod 29 to clutch-disengaging position (Fig. 4), and means including a timer, powered by the take-off drive, controlling the drive for the pump and operable periodically to shift the rod 29 back to clutch-engaging position. The timer thus initiates another cycle of operation, the pump operating until the injectors have cycled, and until the pressure-responsive means has again subsequently disengaged the clutch.

The means responsive to pressure developed by the pump controlling the pump drive includes a pressure-responsive actuator, generally designated 45, subject to pressure developed by the pump, and acting on rod 29 through a snap-acting over-centering spring toggle mechanism generally designated 47. This toggle mechanism, in the specific embodiment herein illustrated, comprises two individual toggles, one generally designated 49 and the other 51. Toggle 49 comprises a lower rigid arm or link 53, and an upper extensible arm or link 55. The rigid link 53 is of channel shape in cross-section (see Fig. 6), and is pivoted at its lower end on a stud 57 extending horizontally from the mechanism plate 37 under and transverse to the rod 29. The upper extensible link 55 comprises a sleeve 59 pin-connected at 61 (the knee of the toggle 49) to the upper end of the rigid link 53, and a rod 63 telescopically slidable in the sleeve and pivoted at its upper end on an upper stud 65 extending horizontally from the mechanism plate 37 directly above the stud 57. A helical coil spring 67 surrounding the sleeve 59 and the rod 63 is compressed between the upper end of the rod and the lower end of the sleeve. Toggle 49 is located closely adjacent the side of plate 37 towards the rod 29. Toggle 51 is located on the side of toggle 49 toward the rod 29, and comprises a lower rigid arm or link 69 located in and narrower than the channel of the rigid link 53, and an upper extensible arm or link 71. The rigid link 69 is pivoted at its lower end on the stud 57, and is somewhat shorter than the rigid link 53. The upper extensible link 71 comprises a sleeve 73 pin-connected at 75 (the knee of the toggle 51) to the upper end of the rigid link 69, this connection being offset below the connection 61 so that the two toggles are slightly out of phase, and further comprises a rod 77 telescopically slidable in the sleeve and pivoted at its upper end on the stud 65. A helical coil spring 79 surrounds the sleeve 73 and rod 77, being compressed between the upper end of the rod and the lower end of the sleeve.

The rod 29 has a transverse pin 81 which extends loosely into an opening 82 in the rigid link 69 of toggle 51. The arrangement is such that when the toggle 51 is broken in the direction away from the pump (Fig. 4), the clutch-shifting rod 29 is in clutch-disengaging position. The toggle 51 is actuated by the channel-section rigid link 53 of the toggle 49. When link 53 swings clockwise from its Fig. 3 position, the left-hand side of the channel of link 53 engages the link 69 of toggle 51 and swings it clockwise. Conversely, when the link 53 swings counterclockwise from its Fig. 4 position, the right-hand side of the channel of link 53 engages the link 69 to swing it counterclockwise. The purpose in having the two toggles slightly out of phase is to insure that when the rod 29 is shifted to clutch-engaging position (Fig. 3), there is a positive spring bias on the clutch jaw 27 holding it in engagement with jaw 25. With link 69 narrower than the sides of the channel-section link 53, and with the toggles out of phase by reason of their offset knees, toggle 51 has a somewhat greater throw than toggle 49 to accomplish this.

Toggle 49 is actuated by a lever 83 mounted for rocking movement on the outer side of plate 37 on a stud 85 which extends outward from plate 37 in axial alignment with stud 57, and on the opposite side of the plate 37 from the stud 57. The rigid link 53 of toggle 49 has a pin 87 extending through an arcuate slot 89 in the plate 37 into position for engagement by a finger 91 extending upward from the lever 83, the arrangement being such that when the toggles are in their clutch-engaging position (Fig. 3) and the lever is rocked clockwise as viewed in this figure (counterclockwise as viewed in Fig. 7), finger 91 engages the pin 87 and thereby swings link 53 clockwise, link 53 carrying link 69 with it, until the knees of the toggles pass the vertical plane including the studs 57 and 65, whereupon the toggles snap to their clutch-disengaging position (Fig. 4).

At its lower end the lever 83 carries a pin 93 which extends through an arcuate slot 95 in plate 37 for actuation by the pressure-responsive actuator 45. The latter comprises a cylinder 97 having a bore 99 and an enlarged internally threaded counterbore 101 at one end (the left end as viewed in Figs. 3 and 4) of the bore. The cylinder has a head 103 threaded into the counterbore through an opening 104 in the flange 35 of plate 37, this flange being the one remote from the pump. The head has a shoulder 105 which engages the flange 35 around the opening 104. The axis of the cylinder extends parallel to and below the rod 29 and intersects the pin 93. A packing washer is shown at 107 compressed between the end of the cylinder and the flange 35. A piston or plunger 109 is reciprocable in the bore 99. A piston rod 111 extends from the left end of the piston as viewed in Fig. 4 through the cylinder head 103 to engage the pin 93. A compression spring 113 surrounds the rod 111 between the head 103 and a collar 115 on the rod at its piston end to bias the rod and the piston in the direction away from the pin 93. The end of the bore 99 opposite the counterbore 101 is placed in communication with the lubricant line 3 through a pipe 117. The bias of toggle mechanism and the spring 113 on the piston is such that a pressure slightly higher than injector-cycling pressure is required to cause the piston and the rod 111 to move to the left as viewed in Fig. 3 and, acting through pin 93, to overcenter the toggle mechanism.

The timer, in the specific embodiment herein illustrated, comprises a ratchet 121 which is rotary on stud 85 and also axially slidable on this stud toward and away from the lever 83. The ratchet has a hub 123 projecting toward the free end of the stud 85. A pawl arm 125 rocks on the hub and carries a pawl 127 for turning the ratchet. A helical coil spring 129 surrounds the stud 85 and is compressed between a collar 131 at the end of the stud and a cap 133 fitted on the hub. The cap holds the pawl arm on the hub. At 135 is shown a holding pawl pivoted on the mechanism plate 37. The pawl arm is continuously oscillated by means of a drive deriving power from the pulley 41. This drive includes a spur gear 137 fixed to the pulley on the axis of the rod 29. Gear 137 is in mesh with the first gear 139 of a speed-reducing gear train generally designated 141. The gears of this train are arranged with their axes parallel to the axis of the rod 29 and are mounted on a vertical plate 143. This plate is fixed to the flange 33 extending transversely with respect to rod 29. Gear 137 moves axially with the rod 29 as the latter moves between its clutch-engaging and clutch-disengaging positions, but remains in mesh with the gear 139. The final gear of the speed-reducing gear train 141 is designated 145. This gear is positioned adjacent the ratchet 121. It carries a disc 147 positioned eccentrically with respect to the gear axis. Journalled on this disc is a strap 149 which is coupled to a finger 151 on the pawl arm. The arrangement is such that rotation of gear 145 effects oscillation of the strap and oscillation of the pawl arm 125, the throw of the latter being dependent upon the eccentricity of disc 147 with respect to the axis of gear 145. If desired, provision may be made for varying the eccentricity of disc 147 with respect to the axis of gear 145, to vary the throw of the pawl arm so as to vary the degree through which the ratchet 121 is turned upon each oscillation of the pawl arm.

The ratchet 121 turns clockwise as viewed in Fig. 1. It carries a pin 153 adapted to engage the pin 87 once each revolution of the ratchet to swing the toggle link 53 counterclockwise as viewed in Figs. 3 and 4 to cause the toggle mechanism to shift the rod 29 from clutch-disengaging position (Fig. 4) to clutch-engaging position. The ratchet carries a cam follower pin 155, positioned on a smaller radius than that of pin 153, adapted to engage a cam 157 on the lever 83 to cause the ratchet 121 to be shifted axially away from the lever 83 to allow pin 153 on the ratchet to clear the pin 87 (and finger 91), so that after pin 153 has engaged pin 87 and effected shifting of the rod 29, the ratchet may continue turning. The cam 157 is so developed as to effect shifting of the ratchet 121 axially on the stud against the bias of spring 129 a distance sufficient to disengage the pins 153 and 87 and so phased that once the pin 153 has by-passed pin 87, pin 155 rides off the cam and the spring 129 thereupon returns the ratchet to its nominal position wherein pin 153 is adapted to come into engagement with pin 87. The ratchet then remains in this position until it has completed another revolution and pin 153 has engaged pin 87 and effected shifting of rod 29.

Operation is as follows:

The pulley 41, and clutch jaw 27 and gear 137 affixed thereto, are continuously driven through the power take-off from the device to be lubricated. Gear 145, the last gear of the speed-reducing gear train 141, is continuously driven and hence the pawl arm 125 is continuously oscillated. Upon each oscillation of the pawl arm, the pawl 127 steps the ratchet forward a fraction of a revolution. How much the ratchet is stepped forward is determined by the throw of the pawl arm, and this is determined by the eccentricity of the disc 147 with respect to the axis of gear 145. The eccentricity of the disc may, for example, be such as to step the ratchet forward one tooth upon each oscillation of the pawl arm. Thus, the ratchet is turned very slowly as regards the speed of the timer input gear 137. Reverse rotation of the ratchet upon the return stroke of the pawl arm is prevented by the holding pawl 135. The ratchet turns clockwise as viewed in Fig. 1 and this rotates pins 153 and 155 clockwise about the axis of stud 85 as viewed in Fig. 7 (as indicated by the arrows in Fig. 7).

The conclusion of one cycle of operation of the apparatus and the start of the next cycle occurs at the instant when the pin 153 on the ratchet 121 engages the pin 87 on link 53 of toggle 49, and effects shifting of the rod 29 from its Fig. 4 position to its Fig. 3 position, thereby to engage the clutch jaws 25 and 27 and initiate operation of the pump 7. At this time, there is little or no pressure in lubricant line 3, line 117 and cylinder 97, and the piston 109 and piston rod 111 are in their retracted position illustrated in Fig. 3. With the pump in operation, pressure quickly builds up in lubricant line 3, line 117 and the cylinder 97, and when it reaches injector-cycling value, which occurs in a fraction of the time it takes the ratchet to make a complete revolution, the injectors 1 operate to inject their charges of lubricant into the bearings or other parts of the device to be lubricated.

After the pin 153 on the ratchet 121 has completed its action of shifting the rod 29 to clutch-engaging position, the ratchet 121 is shifted to the right as viewed in Fig. 5 to move pin 153 clear of pin 87 (and finger 91) to allow the ratchet to continue turning. This shifting occurs due to pin 155 engaging the cam 157 on the lever 83. The ratchet is biased back toward the left by the spring 129 and as soon as pin 155 rides off the end of the cam, the ratchet is shifted back to its normal Fig. 5 position so that pin 153 will be in position to engage pin 87 upon completion of the next revolution of the ratchet. The pawl arm 125 and pawl 127 shift with the ratchet.

Immediately following the actuation of the injectors upon attainment of injector-cycling pressure, the pressure developed by the pump becomes sufficient to cause piston 109 and piston rod 111 to be driven to the left from their retracted position shown in Fig. 3 to the position shown in Fig. 4. As the piston rod 111 moves to the left from its Fig. 3 position, it acts through the pin 93 on lever 83 to rock lever 83 counterclockwise as viewed in Fig. 7. It will be understood that pin 153 on the ratchet 121 has already passed by the pin 87 (and finger 91) so that no impedance is offered by pin 153 to this rocking movement of lever 83. As the lever rocks counterclockwise as viewed in Fig. 7, finger 91 on the lever engages pin 87 on toggle link 53 and rocks link 53 clockwise from its Fig. 3 position. Link 53 carries toggle link 69 along with it, and both toggles snap over center to their Fig. 4 position. As the toggles overcenter, the toggle link 69, acting through pin 81, shifts rod 29 to the right from its Fig. 3 position to its Fig. 4 position to disengage the clutch jaws 25 and 27. This stops the pump. The pressure in cylinder 97, line 117 and line 3 is thereupon relieved through the self-venting pump. This permits the injectors 1 to re-set and re-charge for the next injection. It also permits piston 109 and piston rod 111 to return to their retracted position shown in Fig. 3 under the bias of spring 113.

The pump remains out of operation until the pin 153 on ratchet 121 again engages the pin 87 to rock the toggle link 53 counterclockwise from its Fig. 4 position. Link 53 carries toggle link 69 along with it, and both toggles snap over center to their Fig. 3 position. As the toggles overcenter, the toggle link 69, acting through the pin 81, shifts rod 29 to the left from its Fig. 4 position to its Fig. 3 position to engage the clutch jaws 25 and 27. This initiates operation of the pump, which continues in operation until it develops sufficient pressure to terminate its operation as previously described. As the pin 153 comes into engagement with pin 87, pin 155 starts riding up on cam 157. This shifts the ratchet 121 to the right as viewed in Fig. 5 so that the pin 153 is shifted clear of pin 87 to enable the ratchet to continue rotating. When pin 155 rides off the cam 157, spring 129 moves the ratchet 121 back to its active position shown in Fig. 6, and so on as previously described.

Thus, the pump 7 is periodically put into operation by the timing mechanism. In the specific embodiment herein disclosed, operation of the pump is initiated at intervals corresponding to the length of time required for the ratchet 121 to make one complete revolution. In each cycle of operation of the apparatus, the pump is operated until it develops injector-cycling pressure, then it acts through the pressure-responsive actuator 45 to stop itself, then it remains out of operation until the ratchet, completing a revolution, starts the next cycle. Preferably, the action of the pump is such that injector-cycling pressure is built up very quickly as regards the period of the timing mechanism.

From the above, it will be seen that the invention provides a lubricating apparatus with which it is possible readily and economically to provide for automatic periodic lubrication of any power-driven device. All that needs be done, so far as installation is concerned, is to provide lubricant injectors for the points of the device to be lubricated, connect the pump outlet to the injectors, and install the power take-off from the device to the lubricating apparatus. No separate or independent source of power is needed for the timer, this deriving the energy required for its operation from the apparatus itself through the power take-off. Whatever periodicity of injection is desired may be established by appropriate adjustment of the drive for the ratchet.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Lubricating apparatus comprising a lubricant pump having an outlet for connection of a lubricant line for supplying lubricant to one or more injectors provided for lubricating a power-driven device, a drive for the pump including a clutch having a driving element adapted to be driven through a power take-off from the device to be lubricated, a control operable on the clutch for engaging and disengaging it, a timer adapted to derive power for its operation from the source of power for the power-driven device and acting periodically on the control to engage the clutch thereby periodically to initiate operation of the pump, and means responsive to pressure developed by the pump acting on the control independently of the timer to disengage the clutch to terminate operation of the pump following each initiation of operation thereof by the timer upon development by the pump of injector-cycling pressure.

2. Lubricating apparatus comprising a lubricant pump having an outlet for connection of a lubricant line for supplying lubricant under pressure to lubricant injectors provided for lubricating a power-driven device, each injector being of a type which functions upon being supplied through said line with lubricant at injector-cycling pressure to inject a measured charge of lubricant, and which requires relief of pressure in said line to re-set and re-charge, a drive for the pump including a clutch having a driving element adapted to be driven through a power take-off from the power-driven device to be lubricated, a control operable on the clutch for engaging and disengaging it, a timer adapted to derive power for its operation from the source of power for the power-driven device and acting periodically on the control to engage the clutch thereby periodically to initiate operation of the pump, and means responsive to pressure developed by the pump acting on the control independently of the timer to disengage the clutch to terminate operation of the pump following each initiation of operation thereof by the timer upon development by the pump of injector-cycling pressure.

3. Lubricating apparatus as set forth in claim 2 wherein the pump is a rotary self-venting pump.

4. Lubricating apparatus as set forth in claim 2 wherein the pump is a rotary gear pump.

5. Lubricating apparatus comprising a lubricant pump having an outlet for connection of a lubricant line for supplying lubricant to one or more injectors provided for lubricating a power-driven device, a drive for the pump including a clutch having a driving element adapted to be driven through a power take-off from the device to be lubricated, a control operable on the clutch for engaging and disengaging it, a mechanical timer driven from the driving element of the clutch controlling the clutch and acting on the control periodically to engage the clutch thereby periodically to initiate operation of the pump, and means responsive to pressure developed by the pump acting on the control independently of the timer to disengage the clutch to terminate operation of the pump following each initiation of operation thereof by the timer upon development by the pump of injector-cycling pressure.

6. Lubricating apparatus comprising a lubricant pump having an outlet for connection of a lubricant line for supplying lubricant to one or more injectors provided for lubricating a power-driven device, a drive for the pump including a clutch having a driving element adapted to be driven through a power take-off from the device to be lubricated, snap-acting shifting mechanism operable on the clutch for engaging and disengaging it, a timer adapted to derive power for its operation from the source of power for the power-driven device and acting periodically on the shifting mechanism to engage the clutch thereby periodically to initiate operation of the pump, and means responsive to pressure developed by the pump acting on the shifting mechanism independently of the timer to disengage the clutch to terminate operation of the pump following each initiation of operation thereof by the timer upon development by the pump of injector-cycling pressure.

7. Lubricating apparatus as set forth in claim 6 wherein said snap-acting mechanism comprises an overcentering spring toggle mechanism.

8. Lubricating apparatus as set forth in claim 6 wherein said snap-acting mechanism comprises a pair of overcentering spring toggles which operate slightly out of phase in such manner as to provide a spring bias holding the clutch engaged when shifted to clutch-engaging position.

9. Lubricating apparatus comprising a lubricant pump having an outlet for connection of a lubricant line for supplying lubricant to one or more injectors provided for lubricating a power-driven device, a drive for the pump including a clutch having a driving element adapted to be driven through a power take-off from the device to be lubricated, snap-acting shifting mechanism operable on the clutch for engaging and disengaging it, a mechanical timer driven from the driving element of the clutch and acting periodically on said shifting mechanism to engage the clutch thereby periodically to initiate operation of the pump, and means responsive to pressure developed by the pump acting on the shifting mechanism independently of the timer to disengage the clutch to terminate operation of the pump following each initiation of operation thereof by the timer upon development by the pump of injector-cycling pressure.

10. Lubricating apparatus comprising a lubricant pump, a drive for the pump including a clutch, a shifter for engaging and disengaging the clutch, a timer operable on the shifter periodically to engage the clutch to drive the pump, and a pressure-responsive actuator in communication with the pump outlet operable on the shifter in response to development by the pump of a predetermined pressure to disengage the clutch and stop the pump.

11. Lubricating apparatus comprising a lubricant pump, a drive for the pump including a clutch having a shiftable driving element and a driven element, mechanism for shifting the driving element into and out of engagement with the driven element, a timer operable on the shifting mechanism periodically to shift the driving element into engagement with the element to drive the pump, and a pressure-responsive actuator in communication with the pump outlet operable on the shifting mechanism in response to development by the pump of a predetermined pressure to shift the driving element out of engagement with the driven element to stop the pump.

12. Lubricating apparatus comprising a lubricant pump, a drive for the pump including a clutch having a driven element and a shiftable driving element, mechanism for shifting the driving element into and out of engagement with the driven element, a mechanical timer driven from the driving element operable on the shifting mechanism periodically to shift the driving element into engagement with the driven element to drive the pump, and a pressure-responsive actuator in communication with the pump outlet operable on the shifting mechanism in response to development by the pump of a predetermined pressure to shift the driving element out of engagement with the driven element to stop the pump.

13. Lubricating apparatus comprising a lubricant pump, a drive for the pump including a clutch having a driven element and a driving element, shifting mechanism for engaging and disengaging the clutch, timing mechanism including a rotary ratchet, an oscillable pawl engaging the ratchet, and means driven from the driving element of the clutch for oscillating the pawl to effect step-by-step rotation of the ratchet, means on the ratchet engageable with said shifting mechanism once each revolution of the ratchet to actuate said mechanism to engage the clutch to drive the pump, and a pressure-responsive actuator in communication with the pump outlet operable on the shifting mechanism in response to development by the pump of a predetermined pressure to actuate said shifting mechanism to disengage the clutch to stop the pump.

14. Lubricating apparatus comprising a lubricant pump, a drive for the pump including a clutch having a driven element and a shiftable driving element, mechanism for shifting the driving element into and out of engagement with the driven element, timing mechanism including a rotary ratchet, an oscillable pawl engaging the ratchet, and means driven from the driving element of the clutch for oscillating the pawl to effect step-by-step rotation of the ratchet, a pin on the shifting mechanism, a pin on the ratchet engageable with the pin on the shifting mechanism once each revolution of the ratchet to actuate said shifting mechanism to shift the driving element into engagement with the driven element to drive the pump, said ratchet being mounted for axial movement between a first position wherein its pin is adapted to engage the pin of the shifting mechanism and a second position wherein its pin clears the pin of the shifting mechanism, means biasing the ratchet to its said first position, cam means for moving the ratchet to its second position after the ratchet has effected engagement of the driving element with the driven element of the clutch and then permitting the ratchet to return to its said first position under its bias, and a pressure-responsive actuator in communication with the pump outlet operable on the shifting mechanism in response to development by the pump of a predetermined pressure to actuate said shifting mechanism to shift the driving element out of engagement with the driven element to stop the pump.

15. Lubricating apparatus as set forth in claim 14 wherein the shifting mechanism comprises a snap-acting overcentering spring toggle mechanism coupled to the driving element.

16. Lubricating apparatus as set forth in claim 14 wherein the shifting mechanism comprises a first and a second snap-acting overcentering spring toggle, a lever for operating the first toggle, the lever carrying the pin engaged by the pin on the ratchet, and means coupling the first toggle to the second and the second to the driving element of the clutch with the toggles operable slightly out of phase in such manner as to provide a spring bias holding the driving element of the clutch engaged with the driven element when shifted into engagement with the driven element.

VICTOR G. KLEIN.

References Cited in the file of this patent
UNITED STATES PATENTS

| Number | Name | Date |
|---|---|---|
| 2,029,327 | Lippincott | Feb. 4, 1936 |
| 2,035,157 | Hallerberg | Mar. 24, 1936 |
| 2,135,563 | Davis | Nov. 8, 1938 |
| 2,206,335 | Rotter | July 2, 1940 |
| 2,219,681 | Davis | Oct. 29, 1940 |
| 2,581,314 | Walker | Jan. 1, 1952 |